(12) United States Patent
Rieger et al.

(10) Patent No.: US 8,741,169 B2
(45) Date of Patent: Jun. 3, 2014

(54) HEAT STORAGE COMPOSITION COMPRISING SODIUM SULFATE DECAHYDRATE AND SUPERABSORBENT

(75) Inventors: Ralph Rieger, Ludwigshafen (DE); Jens Charles, Bobenheim-Roxheim (DE); Tina Schroeder-Grimonpont, Rheinzabern (DE); Francisco Javier Lopez Villanueva, Schifferstadt (DE); Juergen Mertes, Ludwigshafen (DE); Evgueni Klimov, Ludwigshafen (DE); Gregor Herth, Trostberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/614,131

(22) Filed: Sep. 13, 2012

(65) Prior Publication Data

US 2013/0075646 A1    Mar. 28, 2013

Related U.S. Application Data

(60) Provisional application No. 61/538,959, filed on Sep. 26, 2011.

(51) Int. Cl.
*E04B 1/74*    (2006.01)

(52) U.S. Cl.
USPC .......................................................... 252/62

(58) Field of Classification Search
None
See application file for complete search history.

(56) References Cited

U.S. PATENT DOCUMENTS

| | | | |
|---|---|---|---|
| 4,585,843 A | 4/1986 | Flesher et al. | |
| 5,626,936 A | 5/1997 | Alderman | |
| 6,241,928 B1 | 6/2001 | Hatsuda et al. | |
| 6,319,599 B1 | 11/2001 | Buckley | |
| 2002/0033247 A1* | 3/2002 | Neuschutz et al. | 165/10 |
| 2009/0191408 A1* | 7/2009 | Tian et al. | 428/402 |

FOREIGN PATENT DOCUMENTS

| | | | |
|---|---|---|---|
| DE | 3825366 A1 | 2/1989 | |
| DE | 19846 413 A1 | 4/2000 | |
| DE | 10 2007 055 343 A1 | 5/2008 | |
| EP | 0 273 779 A1 | 7/1988 | |
| EP | 0 343 427 A2 | 11/1989 | |
| EP | 0 445 619 A2 | 9/1991 | |
| EP | 0 457 660 A1 | 11/1991 | |
| EP | 0 955 086 A2 | 11/1999 | |
| WO | WO 01/38402 A1 | 5/2001 | |

* cited by examiner

*Primary Examiner* — Ling Choi
*Assistant Examiner* — Catherine S Branch
(74) *Attorney, Agent, or Firm* — Oblon, Spivak, McClelland, Maier & Neustadt, L.L.P.

(57) ABSTRACT

The present invention relates to a heat storage composition comprising
60-98% by weight of sodium sulfate decahydrate and
1-10% by weight of one or more superabsorbents
1-10% by weight of one or more nucleators and
0-20% by weight of one or more water-soluble salts,
based in each case on the heat storage composition, said superabsorbent comprising, in polymerized form,
a) at least 50 mol %, based on the superabsorbent, of one or more monoethylenically unsaturated monomers comprising acid groups, the degree of neutralization of the monoethylenically unsaturated monomers comprising acid groups being 15 to 85 mol %, and
b) 0.015 to 0.1 mol %, based on the total amount of monomers, of at least one crosslinker,
to a process for production thereof and to the use thereof as a heat-storing building material and as a heat storage element for motor vehicles, walls of transport vessels or other heat storage vessels.

35 Claims, No Drawings

HEAT STORAGE COMPOSITION COMPRISING SODIUM SULFATE DECAHYDRATE AND SUPERABSORBENT

The present invention relates to a heat storage composition comprising sodium sulfate decahydrate and one or more superabsorbents, to a process for production thereof, to the use thereof as a heat-storing building material and as a heat storage element for vehicles, walls of transport vessels or other heat storage vessels.

In the last few years, building materials comprising latent heat storage materials have been studied as a new material combination. The mode of operation of the latent heat storage materials, often also referred to as PCMs (phase change materials), is based on the enthalpy of conversion which occurs at the solid/liquid phase transition, which means an absorption of energy from or release of energy to the environment. They can thus be used to keep the temperature constant within a fixed temperature range. In many cases, the latent heat storage materials used are organic paraffins which melt when the phase transition is crossed. The liquid phase generally necessitates stabilization of shape by means, for example, of a shell or a capsule wall.

As an alternative to microencapsulation, U.S. Pat. No. 6,319,599 teaches the production of a heat storage composite by dispersion of a superabsorbent and of a latent heat storage material in a matrix. The superabsorbent binds the liquid latent heat storage material and thus keeps it in the matrix.

Salt hydrates likewise have high enthalpies of fusion and hence good heat storage properties. A problem with the salt hydrates is, however, that they melt incongruently. Thus, not enough water of crystallization is released to completely dissolve the salt. As well as a salt-saturated aqueous solution, solid hydrates also form with a lower content of water of crystallization than the salt hydrates used. This, however, generally results in separation of the salt hydrates, the consequence of which is that the reaction is not completely reversible and the heat capacity of the system decreases with each cycle.

In order to prevent such separation, EP 273 779 teaches the polymerization of sodium acrylate and a crosslinker in the presence of anhydrous sodium sulfate and water. The superabsorbent which forms swells due to the water and thus prevents the separation of the melting salt. However, it has been found that the sodium sulfate separates out as early as in the course of production of the mixture, and hence no homogeneous mixture can be obtained.

U.S. Pat. No. 4,585,843 teaches gel polymerization of acrylates in the presence of inorganic salt hydrates such as sodium sulfate decahydrate for removal of heat. The acrylates used are sodium acrylate and the mixtures thereof with acrylamide.

There has accordingly been a search for compositions in which there is no separation in the case of incongruently melting inorganic latent heat stores. In addition, the mixture should have a low tendency to subcooling.

Accordingly, a heat storage composition has been found, comprising
60-98% by weight of sodium sulfate decahydrate and
1-10% by weight of one or more superabsorbents
1-10% by weight of one or more nucleators and
0-20% by weight of one or more water-soluble salts,
based in each case on the heat storage composition, said superabsorbent comprising, in polymerized form,
  a) at least 50 mol % based on the superabsorbent, of one or more monoethylenically unsaturated monomers comprising acid groups, the degree of neutralization of the monoethylenically unsaturated monomers comprising acid groups being 15 to 85 mol %, and
  b) 0.015 to 0.1 mol %, based on the total amount of monomers, of at least one crosslinker.

The application further relates to a process for production thereof and to the use thereof as a heat-storing building material and as a heat storage element for vehicles, walls of transport vessels or other heat storage vessels.

Sodium sulfate decahydrate releases 250 J/g in the course of melting at its melting point of 32° C. It is commercially available in different purities, for example 90%, 97% or >99%. Since a higher enthalpy of fusion is associated with increasing purity, salts of higher purity are preferred. But good results can also be achieved even with substances of lower purity.

Superabsorbents are known. For such materials, names such as "highly swellable polymer", "hydrogel" (often also used for the dry form), "hydrogel-forming polymer", "water-absorbing polymer", "absorbent gel-forming material", "swellable resin", "water-absorbing resin" or the like are also commonly used. These are crosslinked hydrophilic polymers, the most common being water-absorbing polymers based on partly neutralized acrylic acid. The essential properties of superabsorbents are their abilities to absorb several times their own weight of aqueous liquids and not to release the liquid again even under a certain pressure.

Superabsorbents used in accordance with the invention comprise, in polymerized form,
  a) at least 50 mol %, based on the total amount of all monomers, of monoethylenically unsaturated monomers comprising acid groups, the degree of neutralization of the monoethylenically unsaturated monomers comprising acid groups being 15 to 85 mol %,
  b) 0.015 to 0.1 mol %, based on the total amount of all monomers, of at least one crosslinker and
  c) optionally one or more ethylenically and/or allylically unsaturated monomers other than and copolymerizable with the monomers a).

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

The proportion of monomers a) is preferably at least 70 mol %, more preferably at least 90 mol %, especially at least 95 mol %, and preferably at most 99.985 mol %, based on the total amount of all monomers.

The proportion of acrylic acid, methacrylic acid and/or the respective salts thereof in the total amount of monomers a) is preferably at least 50 mol %, more preferably at least 90 mol %, most preferably at least 95 mol %.

According to the invention, the acid groups of the monomers a) in polymerized form have been neutralized to an extent of 15 to 85 mol %. In other words: the superabsorbent has a degree of neutralization (DN) of 15 to 85%. The degree of neutralization is defined as the molar proportion of the monomers comprising neutralized acid groups compared to the molar total amount of neutralized and non-neutralized monomers comprising acid groups. The acid groups of monomer a) in polymerized form have preferably been neutralized to an extent of 25 to 80 mol %, more preferably to an extent of 25 to 60 mol %, most preferably to an extent of 25 to 50 mol %.

It is possible to use monomers bearing already partly neutralized acid groups. It is likewise possible to neutralize a portion of the acid groups of the polymer. Finally, it is also possible to select a combination of polymerization of partly neutralized monomers and subsequent neutralization of a portion of the acid groups. Preference is given to selecting partly neutralized monomers a) whose degree of neutralization already corresponds to the degree of neutralization of the superabsorbent used in accordance with the invention.

For neutralization, the customary neutralizing agents can be used, for example alkali metal hydroxides, alkali metal oxides, alkali metal carbonates or alkali metal hydrogencarbonates, and mixtures thereof. Instead of alkali metal salts, it is also possible to use ammonium salts.

Sodium and potassium as alkali metals are particularly preferred, but very particular preference is given to sodium hydroxide, sodium carbonate or sodium hydrogencarbonate and mixtures thereof.

The neutralization can, however, also be undertaken with ammonia, amines or alkanolamines such as ethanolamine, diethanolamine or triethanolamine. The preferred neutralizing agents can also be used in a mixture with further neutralizing agents.

The crosslinkers b) are monomers having at least two polymerizable groups which can be polymerized by free-radical means into the polymer network. Suitable crosslinkers b) have at least two functional radicals selected from acrylamide, vinyl ether, allyl ether and allylamine radicals.

Preferred crosslinkers are N,N'-methylenebisacrylamide and N,N'-methylenebismethacrylamide, allyl and vinyl ethers of di- and polyols, triallylamine and derivatives thereof, tetraallylalkylenediamine and derivatives thereof, for example tetraallylethylenediamine, polyallylated amines, allyl ethers of phosphoric acid, and vinylphosphonic acid derivatives, as described, for example, in EP 343 427 A2.

Examples of diallyl and divinyl ethers of di- and polyols include butanediol diallyl ether or divinyl ether, ethylene glycol diallyl ether or divinyl ether, pentaerythrityl di-, tri- and pentaerythrityl tetraallyl ether, polyethylene glycol diallyl ether, glyceryl di- and glyceryl triallyl ether, polyallyl ethers based on sorbitol, and ethoxylated variants thereof. In the process according to the invention, it is possible to use, for example, divinyl and diallyl ethers of polyethylene glycols, where the polyethylene glycol used has 2 to 15 and preferably 2 to 6 repeat units.

Particularly advantageous crosslinkers (monomers b) are diallyl ethers and divinyl ethers of polyethylene glycol having 2 to 15 repeat units, and the di- and triallyl ethers and di- and trivinyl ethers of 2- to 15-tuply ethoxylated glycerol, of 2- to 15-tuply ethoxylated trimethylolpropane, of 2- to 15-tuply ethoxylated trimethylolethane, especially of 2- to 6-tuply ethoxylated glycerol or trimethylolpropane.

Additionally advantageous are polyallylated amines such as tetraallylammonium halides.

Very particularly preferred crosslinkers b) are tetraallylammonium chloride and divinyl and diallyl ethers of polyethylene glycol having 2 to 15 and preferably 2 to 6 repeat units. These have a high hydrolysis stability in salt melts and have good water solubility in order to ensure homogeneous polymerization into the superabsorbent.

The proportion of crosslinkers b) is at least 0.015 mol %, preferably at least 0.02 mol %, and at most 0.1 mol %, especially at most 0.05 mol %, based on the total amount of all monomers.

Monoethylenically unsaturated monomers c) other than the monomers a) do not bear any acid groups. Monomers c) are, for example, acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

The proportion of monomers c) is preferably at most 30 mol %, especially at most 10 mol %, based on the total amount of all monomers. More preferably, the superabsorbent consists only of monomers a) and b) in polymerized form.

The polymerization can be performed in the presence of customary polymerization regulators. Suitable polymerization regulators are, for example, thio compounds, such as thioglycolic acid, mercapto alcohols, e.g. 2-mercaptoethanol, mercaptopropanol and mercaptobutanol, dodecyl mercaptan, formic acid, ammonia and amines, e.g. ethanolamine, diethanolamine, triethanolamine, triethylamine, morpholine and piperidine.

Monomers (a), (b) and optionally (c) are (co)polymerized with one another in 20 to 80%, preferably 20 to 50% and especially 30 to 45% by weight aqueous solution in the presence of polymerization initiators. The polymerization initiators used may be photoinitiators and all compounds which decompose to free radicals under the polymerization conditions, for example peroxides, hydroperoxides, hydrogen peroxide, persulfates, azo compounds and what are called the redox initiators. Such polymerization initiators and the amounts used with preference are common knowledge and are described, for example, in DE 10 2007 055 343, to which explicit reference is made.

The photoinitiators used may, for example, be benzoin and benzoin derivatives, such as benzoin ether, benzil and derivatives thereof, such as benzil ketals, aryldiazonium salts, azo initiators, for example 2,2'-azobis(isobutyronitrile), 2,2'-azobis(2-amidinopropane) hydrochloride and/or acetophenone derivatives.

Preference is given to the use of water-soluble initiators. In some cases, it is advantageous to use mixtures of different polymerization initiators, for example mixtures of hydrogen peroxide and sodium peroxodisulfate or potassium peroxodisulfate. Mixtures of hydrogen peroxide and sodium peroxodisulfate can be used in any desired ratio. Preference is given to using redox initiators comprising an oxidizing component, for example a per compound, and a reducing component such as ascorbic acid. Preference is given to using a redox initiator consisting of hydrogen peroxide, sodium peroxodisulfate and ascorbic acid. For example, these components are used in the concentrations of 0.074 mol % of hydrogen peroxide, 0.1 mol % of sodium peroxodisulfate and $5 \cdot 10^{-3}$ mol % of ascorbic acid, based on the monomers.

The aqueous monomer solution may comprise the initiator in dissolved or dispersed form. The initiators can, however, also be supplied to the polymerization reactor separately from the monomer solution.

Superabsorbents are typically obtained by polymerization of an aqueous monomer solution and optionally a subsequent comminution of the hydrogel. Suitable production processes are described in the literature. Superabsorbents are obtained, for example, by:

gel polymerization in a batchwise process, i.e. tubular reactor and subsequent comminution in a meat grinder, extruder or kneader, as described, for example, in EP 445 619 A2 and DE 19 846 413 A1;

polymerization in a kneader, in which case comminution is effected continuously by means of, for example, contrarotatory stirrer shafts, as described, for example, in WO 01/38 402 A1;

polymerization on a belt and subsequent comminution in a meat grinder, extruder or kneader, as described, for example, in EP 955 086 A2, DE 38 25 366 A1 or U.S. Pat. No. 6,241,928, and emulsion polymerization to directly obtain bead polymers of relatively narrow gel size distribution, as described, for example, in EP 457 660 A1.

With regard to details of the process procedure, reference is hereby made explicitly to the documents cited. The reaction is preferably performed in a kneader or on a belt reactor.

According to the invention, the acid groups of the hydrogels obtained have been neutralized to an extent of 15 to 85 mol %. As already described above, the neutralization can be conducted after the polymerization, at the hydrogel stage. It is also possible to conduct some of the neutralization to the desired degree of neutralization prior to the polymerization. In a preferred form, the monomer solution is adjusted prior to polymerization to the desired final degree of neutralization by addition of the neutralizing agent.

The neutralized hydrogel is dried (on the industrial scale, for example, with a belt or roller dryer) until the residual moisture content is preferably below 15% by weight, especially below 10% by weight, the water content being determined by EDANA (European Disposables and Nonwovens Association) recommended test method No. 430.2-02 "Moisture Content". The dry superabsorbent consequently comprises up to 15% by weight of moisture, preferably at most 10% by weight.

Subsequently, the superabsorbent is ground, for example with roll mills, pinned disk mills, hammer mills, cutting mills or vibratory mills. The particle size of the sieved, dry superabsorbent is preferably below 1000 µm, more preferably below 900 µm, even more preferably below 850 µm, and preferably above 0.1 µm, more preferably above 0.5 µm, most preferably above 1 µm. Preference is given to using a superabsorbent with a particle size of 250 µm to 500 µm.

The dry superabsorbents thus produced can subsequently be surface postcrosslinked. Suitable postcrosslinking agents are described, for example, in DE 102007055343, explicit reference being made to the disclosure thereof. Preference is given to using superabsorbents whose surface has not been postcrosslinked.

Nucleators, also referred to as nucleating agents, are understood to mean substances which, in the presence of the molten sodium sulfate decahydrate, generate crystallization seeds or act as such (Römpp Chemie Lexikon, Thieme Verlag), and these promote the formation of a relatively large number of relatively small crystals and accelerate the crystallization process. In this way, subcooling of the melt can be reduced. In order that the nucleators act as such in the aqueous melt, they are water-insoluble or of at most sparing water solubility. Sparing water solubility is understood to means that, at 20° C. under standard pressure, less than 200 g and preferably less than 100 g of nucleator dissolve in one liter of water. The nucleators used may be a wide variety of different compounds, for example borax (disodium tetraborate decahydrate), titanium dioxide, $Al_2O_3$, ZnO, $Zn(OH)_2$, $BaSO_4$, $SrSO_4$, copper powder, graphite and silicon dioxide. Preference is given to using borax as the nucleator.

According to the invention, the nucleator is used in an amount of 1 to 10% by weight, preferably of 3 to 6% by weight, based on the overall composition.

It is additionally possible to lower the temperature of the phase transition and hence the temperature at which the heat is stored by adding one or more salts having a good solubility in water to the mixture. Good solubility is understood to mean that, at 20° C. under standard pressure, more than 200 g and preferably more than 300 g of salt or salt mixture dissolve per liter of water. The salt is generally used in solid form. The solubility in water is merely the criterion for selection as to whether it is suitable in accordance with the invention.

The salt is preferably selected from alkali metal, alkaline earth metal, ammonium and choline halides, and alkali metal, alkaline earth metal, ammonium and choline acetates. Examples include sodium chloride, potassium chloride, ammonium chloride, choline chloride, magnesium chloride, calcium chloride, strontium chloride, barium chloride, sodium bromide, potassium bromide, ammonium bromide, choline bromide, magnesium bromide, calcium bromide, strontium bromide, barium bromide, sodium acetate, potassium acetate, ammonium acetate, choline acetate, magnesium acetate and calcium acetate. Preference is given to sodium chloride, potassium chloride and/or ammonium chloride.

According to the invention, the water-soluble salt is used in an amount of up to 20% by weight, preferably of 5 to 10% by weight, based on the heat storage composition. In general, the amount used is determined by the desired lowering of the melting temperature. For example, 8% by weight of potassium chloride is selected to lower the melting temperature of the heat storage composition to 23° C. To lower the melting temperature of the heat storage composition to 28° C., the addition of 4% by weight of choline chloride is possible. With addition of 8% by weight of $MgSO_4$, a lowering of the melting point to 30° C. is observed.

It is additionally possible to add up to 30% by weight, based on the heat storage composition, of water. The addition of such small amounts of water does not have any adverse effect on the stability of the sodium sulfate decahydrate. The addition leads merely to a slight decrease in the heat capacity of the composition.

The inventive heat storage composition is produced preferably by combining the composition constituents comprising 60-98% by weight of sodium sulfate decahydrate and
1-10% by weight of one or more superabsorbents suitable in accordance with the invention, as described above,
1-10% by weight of one or more nucleators and
0-20% by weight of one or more water-soluble salts,
preferably in solid form, and heating them to >32° C. In this embodiment, it is essential that superabsorbent is used as one component of the mixture. The mixture preferably consists exclusively of sodium sulfate decahydrate, superabsorbent and nucleator in the inventive composition.

In the course of production of the heat storage composition, a homogeneous mixture of all composition constituents is advantageous. Since the composition constituents are all in solid form at room temperature, the sequence of addition is as desired. A homogeneous distribution of the mixture constituents can be achieved with a stirrer or kneader. It is advantageous that superabsorbent and salt hydrate are heated already in the form of a mixture.

Preference is given to heating the composition to a temperature of 50 to 70° C. Even from a temperature of 32° C., softening is observed. It is advantageous, however, to heat to a temperature at least 20° C. above the melting point of sodium sulfate decahydrate or of the melting temperature-lowered mixture. A temperature above 70° C. is generally not advantageous since water vapor forms. Preference is given to heating to a temperature in the range from 55 to 65° C. It is advantageous in accordance with the invention to stir during melting. This can be done, for example, in a kneader. Subsequently, the mixture is allowed to cool to room temperature.

In a preferred variant, the inventive composition is surrounded by a water vapor-tight shell. The material for such a shell may be either flexible or rigid. A rigid embodiment corresponds to a water vapor-tight vessel or container. "Water vapor-tight" is understood to mean that, over a period of 30 days at a temperature of 25° C., the water content falls as a result of evaporation by less than 5%, preferably by less than 1%. Suitable shell materials are, for example, polyethylene, metals such as aluminum, or laminates composed of polyethylene and metals. The shell material is preferably used in the form of a film. Preference is given to selecting a flexible casing, preferably a multicell laminate film as described in U.S. Pat. No. 5,626,936, in order to ensure that, in the event of damage to the film, the material continues to function in the remaining undamaged cells.

The inventive heat storage compositions can be used advantageously as latent heat stores. Inventive compositions encased in such a way can be used as heat-storing building material in home construction, industrial construction, refrigerated warehouse construction, in sectional doors, in office containers, or in automobile construction, caravan construction and shipbuilding, and also in walls for lightweight constructions. This makes it possible to prevent both excessive heating and, in the event of falling outside temperatures, cooling.

For this purpose, for example, an above-described laminate film can be mounted in cavities, as in encountered in roof linings, in dry construction, under roof insulation or behind wall panels. Also conceivable is incorporation into pieces of furniture, for example mounting on the back walls of cabinets or under tabletops.

In addition, they can be used in the walls of transport vessels for cooling or other heat storage vessels. The heat storage compositions are also suitable for heat tanks. This is understood to mean a large vessel which is filled with the heat storage composition and has a heat exchanger, such that it is possible to pump, for example, a heat carrier fluid, typically water, in circulation into a central heating system in order to convey the heat from the tank into the rooms whose temperature is to be controlled or, conversely, excess heat from the rooms into the central heat tank. Likewise possible is a mobile application, by virtue of the tank being mounted on a truck, such that, for example, excess heat can be transported from power plants to any use sites and can be released there to an above-described pumped circulation system.

EXAMPLES

DSC Analysis:

A sample was analyzed by means of differential calorimetry analysis for the melting point and enthalpy of fusion (DSC Q2000 from TA Instruments). To this end, a sample of 5 mg was introduced into a closed sample pan and heated at 1 K/min to 50° C., then cooled to −30° C. and heated again to 50° C. The enthalpy of fusion was inferred from the area below the heat flow-temperature curve in the second heating run.

Production of Superabsorbent S1
DN=50% and DX=0.033%:
Monomer Solution:
69.4 g of acrylic acid (0.96 mol)
242.9 g of a 37.3% by weight aqueous solution of sodium acrylate (0.96 mol)
0.35 g of a 40% by weight aqueous solution of tetraallylammonium chloride (0.65 mmol)
176.75 g of water Initiator Mixture:
2.22 g of a 15% by weight aqueous solution of sodium peroxodisulfate (1.40 mmol)
5.33 g of a 1.3% by weight aqueous solution of hydrogen peroxide (2.04 mmol)
3.05 g of a 0.5% by weight aqueous solution of ascorbic acid (0.09 mmol)

General Procedure

The monomer solution was made up and stirred at room temperature for 10 minutes. Subsequently, it was cooled to 8° C. in an icebath and transferred to a Teflon-coated Dewar vessel, and nitrogen was passed through over a period of 30 minutes. Subsequently, the initiator mixture was added and reaction was allowed to proceed for one hour, in the course of which the solution heated up to approx. 60° C. as a result of the reaction. The resulting gel was mechanically comminuted and dried in a drying cabinet at 150° C. for 90 minutes. The resulting granules were ground in a mill and sieved. The 250-500 μm sieve fraction was used.

Superabsorbents S2-S19

Analogously to the production of superabsorbent S1, further superabsorbents were produced, which differed merely in their degree of neutralization (DN) and degree of crosslinking DX (proportion of the monomers b) based on the total amount of all monomers), and can be found in table 1 below.

TABLE 1

Degree of neutralization (DN) and degree of crosslinking (DX) of the superabsorbents produced

| Superabsorbent | DN in mol % | DX in mol % | Producibility |
|---|---|---|---|
| S2 | 0 | 0.17 | moderate |
| S3 | 0 | 0.83 | good |
| S4 | 15 | 0.033 | moderate |
| S5 | 25 | 0.025 | good |
| S6 | 25 | 0.033 | good |
| S7 | 40 | 0.025 | good |
| S8 | 40 | 0.033 | good |
| S9 | 50 | 0.0083 | moderate |
| S10 | 50 | 0.017 | good |
| S11 | 50 | 0.025 | good |
| S1 | 50 | 0.033 | good |
| S12 | 50 | 0.067 | good |
| S13 | 50 | 0.83 | good |
| S14 | 60 | 0.033 | good |
| S15 | 75 | 0.0083 | good |
| S16 | 75 | 0.017 | good |
| S17 | 75 | 0.17 | good |
| S18 | 75 | 0.83 | good |
| S19 | 100 | 0.17 | poor |

The producibility assesses how easily the superabsorbent can be produced by the above process and hence also on the industrial scale. If the reaction proceeds to completion within 30 min and the gel can easily be comminuted and dried, the producibility is rated as "good". "Moderate" means that one criterion is not quite met; in the case of "poor", several criteria are not quite met or one is very clearly not met.

Example 1

Production of the Heat Storage Composition

Composition
9.3 g of sodium sulfate decahydrate
0.4 g of sodium tetraborate decahydrate (borax)
0.3 g of superabsorbent S1

The above ingredients were mixed in powder form and heated in a plastic beaker with a lid at 65° C. for one hour. The resulting material was cooled until it solidified and ground to small particles.

Examples 2-19

Analogously to example 1, superabsorbents S2 to S19 were used to produce further heat storage compositions and DSC was used to determine the enthalpies of fusion thereof, which can be found in table 2.

TABLE 2

Performance properties of the example compositions

| Example | Superabsorbent | DN [%] | DX [%] | $\Delta H_m$ (J/g) | Stability |
|---|---|---|---|---|---|
| 2 n.i. | S2 | 0 | 0.17 | — | poor |
| 3 n.i. | S3 | 0 | 0.83 | — | poor |
| 4 | S4 | 15 | 0.033 | 210 | moderate |
| 5 | S5 | 25 | 0.025 | 202 | good |
| 6 | S6 | 25 | 0.033 | 193 | good |
| 7 | S7 | 40 | 0.025 | 167 | good |
| 8 | S8 | 40 | 0.033 | 163 | good |
| 9 n.i. | S9 | 50 | 0.0083 | — | poor |
| 10 | S10 | 50 | 0.017 | 191 | good |
| 11 | S11 | 50 | 0.025 | 167 | good |
| 1 | S1 | 50 | 0.033 | 179 | good |
| 12 | S12 | 50 | 0.067 | 150 | good |
| 13 n.i. | S13 | 50 | 0.83 | 143 | good |
| 14 | S14 | 60 | 0.033 | 156 | good |
| 15 n.i. | S15 | 75 | 0.0083 | — | poor |
| 16 | S16 | 75 | 0.017 | 161 | good |
| 17 n.i. | S17 | 75 | 0.17 | 138 | good |
| 18 n.i. | S18 | 75 | 0.83 | 132 | good |
| 19 n.i. | S19 | 100 | 0.17 | 147 | moderate | n.i. not inventive

The lower the heat capacity $\Delta H_m$, the poorer the heat storage composition.

The stability refers to the homogeneity of the mixture in the course of storage over a period of 24 hours at 60° C. in a closed vessel. If the phases clearly separate, the stability is rated as poor; if slight separation of liquid is observed, it is rated as moderate; if no phase separation is evident, it is rated as good.

Example 20

A superabsorbent with the monomer composition described for S1 was produced analogously to the above description, with the difference that 10 g of the monomer mixture were polymerized in the presence of 330 g of molten sodium sulfate decahydrate. The mixture did not exhibit any heat storage effect since it was inhomogeneous due to the phase separation of the sodium sulfate decahydrate before the stabilizing effect of the superabsorbent which forms set in.

Example 21

Melting Point Lowering by Added Salt

Composition
8.5 g of sodium sulfate decahydrate
0.4 g of sodium tetraborate decahydrate (borax)
0.3 g of superabsorbent S14
0.8 g of sodium chloride The constituents were processed analogously to example 1.

Examples 22-31

Analogously to example 21, different salts according to table 3 were used to produce in each case 10 g of a composition consisting of 3% by weight of superabsorbent S14, 4% by weight of borax and x % by weight of salt, based in each case on the overall composition. The residual amount of the composition is sodium sulfate decahydrate.

TABLE 3

Inventive mixture compositions and melting points thereof

| Example | Salt | x [% by wt.] | Melting point in ° C. |
|---|---|---|---|
| 21 | NaCl | 4 | 28 |
| 22 | NaCl | 6 | 27 |
| 23 | NaCl | 8 | 22 |
| 24 | NaOAc | 8 | 30 |
| 25 | choline chloride | 4 | 28 |
| 26 | choline chloride | 8 | 26 |
| 27 | $MgSO_4$ | 8 | 30 |
| 28 | KCl | 2 | 29 |
| 29 | KCl | 4 | 27 |
| 30 | KCl | 6 | 25 |
| 31 | KCl | 8 | 24 |

Example 32

The composition from example 1 was subjected to a long-term cycling test:

A 10 ml ampoule was filled to the top with the composition from example 1, then the ampoule was sealed air- and water-tight. It was then immersed in the water bath of a cryostat. The cryostat ran through the following temperature program 1000 times:
heating to 50° C. within 10 minutes
holding the temperature at 50° C. for 10 minutes
cooling to 10° C. within 10 minutes
holding the temperature at 10° C. for 30 minutes After 1000 cycles, a sample of the composition was subjected to a DSC analysis. A melting point of 32.8° C. and an enthalpy of fusion of 203 J/g were found.

U.S. Provisional Patent Application No. 61/538,959, filed Sep. 26, 2011, is incorporated into the present application by literature reference.

The invention claimed is:

1. A heat storage composition in solid form, comprising 60-98% by weight of sodium sulfate decahydrate and
1-10% by weight of one or more superabsorbents
1-10% by weight of one or more nucleators and
0-20% by weight of one or more water-soluble salts,
based in each case on the heat storage composition, said superabsorbent comprising, in polymerized form,
a) at least 50 mol %, based on the superabsorbent, of one or more monoethylenically unsaturated monomers comprising acid groups, the degree of neutralization of neutralization of the monoethylenically unsaturated monomers comprising acid groups being 15 to 85 mol %, and
b) 0.015 to 0.1 mol %, based on the total amount of monomers, of at least one crosslinker,
wherein the heat storage composition is obtained by combining the sodium sulfate decahydrate, the superabsorbents, the nucleators and the water-soluble salts, and heating to >32° C.

2. The heat storage composition according to claim 1, wherein the superabsorbent comprises, in polymerized form,
a) at least 50 mol %, based on the total amount of all monomers, of monoethylenically unsaturated monomers comprising acid groups, the degree of neutralization of the monoethylenically unsaturated monomers comprising acid groups being 15 to 85 mol %,
b) 0.015 to 0.1 mol %, based on the total amount of all monomers, of at least one crosslinker and
c) optionally one or more ethylenically and/or allylically unsaturated monomers other than and copolymerizable with the monomers a).

3. The heat storage composition according to either of claims 1 and 2, wherein the superabsorbent comprises, in polymerized form, a crosslinker which has at least two functional radicals selected from acrylamide, vinyl ether, allyl ether and allylamine radicals.

4. The heat storage composition according to any of claim 1, wherein the superabsorbent comprises, in polymerized form, a crosslinker selected from N,N'-methylenebisacrylamide and N,N'-methylenebismethacrylamide, allyl and vinyl ethers of di- and polyols, triallylamine and derivatives thereof, tetraallylalkylenediamine and derivatives thereof, polyallylated amines, allyl ethers of phosphoric acid and vinylphosphonic acid derivatives.

5. The heat storage composition according to any of claim 1, wherein the crosslinker is selected from the group consisting of tetraallylammonium chloride, a divinyl and an ether of polyethylene glycol having 2 to 15 repeat units and a diallyl ether of polyethylene glycol having 2 to 15 repeat units.

6. The heat storage composition according to any of claim 1, wherein the nucleator is selected from the group consisting of borax (disodium tetraborate decahydrate), titanium dioxide, $Al_2O_3$, ZnO, $Zn(OH)_2$, $BaSO_4$, $SrSO_4$, copper powder, graphite and silicon dioxide.

7. The heat storage composition according to claim 1, wherein the water-soluble salt is selected from the group consisting of an alkali metal halide an alkaline earth metal halide, ammonium halide, a choline halide, an alkali metal acetate an alkaline earth metal acetate, an ammonium acetate and a choline acetate.

8. The heat storage composition according to claim 1, wherein the heat storage composition is obtained by combining the superabsorbent, the sodium sulfate decahydrate and the nucleator, and heating them to a temperature in the temperature range from 50° C. to 70° C.

9. The heat storage composition according to claim 1, which is surrounded by a water vapor-tight shell.

10. A process for producing a heat storage composition according to claim 1, which comprises producing a mixture comprising the sodium sulfate decahydrate, the superabsorbents, the nucleators and the water-soluble salts and heating the mixture to >32° C.

11. A latent heat store, comprising the heat storage composition according to claim 1.

12. A heat-storing building material, comprising the heat storage composition of claim 1 as a latent heat store.

13. A heat storage element for at least one of a vehicle, a wall of a transport vessel or other heat storage vessel comprising, the heat storage composition of claim 1.

14. The heat storage composition according to claim 1, consisting of the sodium sulfate decahydrate, the superabsorbents, the nucleators and the water-soluble salts.

15. The heat storage composition according to claim 1, wherein the acid groups of the superabsorbent consist of carboxylic acid groups.

16. The heat storage composition according to claim 1, which is in the form of a solid mixture of particles of the sodium sulfate decahydrate, particles of the superabsorbent and particles of the nucleators and, optionally, particles of the water-soluble salts.

17. The heat storage composition according to claim 1, wherein the superabsorbent polymer consists of polymerized monomers (a) containing only unsaturated carboxylic acid groups and polymerized monomers (b) having no acid groups.

18. The heat storage composition according to claim 1, wherein the superabsorbent consists of at least one of acrylic acid, methacrylic acid, maleic acid, fumaric acid and itaconic acid, and at least one ethylenically unsaturated crosslinker.

19. The heat storage composition according to claim 1, having a heat capacity $\Delta H_m$ of 150-210 J/g.

20. The heat storage composition according to claim 1, which is in the form of a homogeneous mixture at room temperature.

21. A heat storage composition comprising
60-98% by weight of sodium sulfate decahydrate and
1-10% by weight of one or more superabsorbents
1-10% by weight of one or more nucleators and
0-20% by weight of one or more water-soluble salts,
based in each case on the heat storage composition, said superabsorbent comprising, in polymerized form,
a) at least 50 mol %, based on the superabsorbent, of one or more monoethylenically unsaturated monomers comprising acid groups, the degree of neutralization of the monoethylenically unsaturated monomers comprising acid groups being 15 to 85 mol %, and
b) 0.015 to 0.1 mol %, based on the total amount of monomers, of at least one crosslinker,
wherein the heat storage composition is obtained by combining the sodium sulfate decahydrate, the superabsorbents, the nucleators and the water-soluble salts, and heating to >32° C., and
wherein the crosslinker is at least one selected from the group consisting of tetraallylammonium chloride, a divinyl of an ether of polyethylene glycol having 2 to 15 repeat units and a diallyl ether of polyethylene glycol having 2 to 15 units.

22. The heat storage composition according to claim 21, wherein the superabsorbent comprises, in polymerized form,
a) at least 50 mol %, based on the total amount of all monomers, of monoethylenically unsaturated monomers comprising acid groups, the degree of neutralization of the monoethylenically unsaturated monomers comprising acid groups being 15 to 85 mol %,
b) 0.015 to 0.1 mol %, based on the total amount of all monomers, of the crosslinker, and
c) optionally one or more ethylenically and/or allylically unsaturated monomers other than and copolymerizable with the monomers a).

23. The heat storage composition according to claim 21, wherein the nucleator is at least one selected from the group consisting of disodium tetraborate decahydrate, titanium dioxide, $Al_2O_3$, ZnO, $Zn(OH)_2$, $BaSO_4$, $SrSO_4$, copper powder, graphite and silicon dioxide.

24. The heat storage composition according to claim 21, wherein the water-soluble salt is at least one selected from the group consisting of an alkali metal halide, an alkaline earth metal halide, an ammonium halide, a choline halide, an alkali metal acetate, an alkaline earth metal acetate, an ammonium acetate, and a choline acetate.

25. The heat storage composition according to claim 21, obtainable by combining the superabsorbent, the sodium sulphate decahydrate and the nucleator, and heating to a temperature in the temperature range from 50 to 70° C.

26. The heat storage composition according to claim 21, which is surrounded by a water vapor-tight shell.

27. A latent heat store, comprising the heat storage composition according to claim 21.

28. A heat-storing building material, comprising the heat storage composition of claim 21 as a latent heat store.

29. A heat storage element for at least one of a vehicle, a wall of a transport vessel or other heat storage vessel comprising, the heat storage composition of claim 21.

30. The heat storage composition according to claim 21, consisting of the sodium sulfate decahydrate, the superabsorbents, the nucleators and the water-soluble salts.

31. The heat storage composition according to claim 21, wherein the acid groups of the superabsorbent consist of carboxylic acid groups.

32. The heat storage composition according to claim 21 which is in solid form.

33. The heat storage composition according to claim 21, wherein the superabsorbent polymer consists of polymerized monomers (a) containing only unsaturated carboxylic acid groups and polymerized monomers (b) having no acid groups.

34. The heat storage composition according to claim 21, having a heat capacity $\Delta H_m$ of 150-210 J/g.

35. The heat storage composition according to claim 21, which is in the form of a homogeneous gel.

* * * * *